United States Patent
Rajagopalan et al.

(10) Patent No.: US 9,473,928 B2
(45) Date of Patent: *Oct. 18, 2016

(54) METHODS, SYSTEMS, AND COMPUTER READABLE MEDIA FOR POLICY-BASED LOCAL BREAKOUT (LBO)

(71) Applicant: Tekelec, Inc., Morrisville, NC (US)

(72) Inventors: Sundaram Rajagopalan, Waltham, MA (US); Apirux Bantukul, Cary, NC (US); Ajay Padmakar Deo, Carrollton, TX (US)

(73) Assignee: Tekelec, Inc., Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,205

(22) Filed: Jul. 15, 2013

(65) Prior Publication Data
US 2014/0018067 A1    Jan. 16, 2014

Related U.S. Application Data

(60) Provisional application No. 61/671,692, filed on Jul. 14, 2012.

(51) Int. Cl.
*H04W 4/00* (2009.01)
*H04W 8/20* (2009.01)
*H04W 8/08* (2009.01)

(52) U.S. Cl.
CPC .............. *H04W 8/20* (2013.01); *H04W 8/082* (2013.01)

(58) Field of Classification Search
None
See application file for complete search history.

(56) References Cited

U.S. PATENT DOCUMENTS

| | | |
|---|---|---|
| 6,144,636 A | 11/2000 | Aimoto et al. |
| 6,661,780 B2 | 12/2003 | Li |
| 6,880,005 B1 | 4/2005 | Bell et al. |
| 7,072,651 B2 | 7/2006 | Jiang et al. |
| 8,305,922 B2 | 11/2012 | Cuervo |
| 8,326,263 B2 | 12/2012 | Zhou et al. |
| 8,331,229 B1 | 12/2012 | Hu et al. |
| 8,335,220 B2 | 12/2012 | Hu et al. |
| 8,353,000 B2 | 1/2013 | He et al. |

(Continued)

FOREIGN PATENT DOCUMENTS

| | | |
|---|---|---|
| CN | 1849787 A | 10/2006 |
| CN | ZL200980130515.0 | 2/2015 |

(Continued)

OTHER PUBLICATIONS

"3rd Generation Partnership Project; Technical Specification Group Services and System Aspects; Local IP Access and Selected IP Traffic Offload (LIPA-SIPTO) (Release 10)," 3GPP TR 23.829, pp. 1-43 (Oct. 2011).

(Continued)

*Primary Examiner* — Shantell L Heiber
(74) *Attorney, Agent, or Firm* — Jenkins, Wilson, Taylor & Hunt, P.A.

(57) ABSTRACT

According to one aspect, the subject matter described herein includes a system for controlling local breakout using a policy infrastructure. The system includes a policy and charging rules function (PCRF) configured to receive an admission request associated with a subscriber from an evolved node B (eNode B) and, in response to the admission request, to install a subscriber-specific policy on the eNode B for implementing local breakout at the eNode B for the subscriber.

20 Claims, 5 Drawing Sheets

(56) References Cited

U.S. PATENT DOCUMENTS

| | | |
|---|---|---|
| 8,400,916 B2 | 3/2013 | Cutler et al. |
| 8,406,137 B2 | 3/2013 | Siddam et al. |
| 8,433,794 B2 | 4/2013 | Baniel et al. |
| 8,438,290 B2 | 5/2013 | Rui et al. |
| 8,543,118 B1 | 9/2013 | Mangal et al. |
| 8,577,329 B2 | 11/2013 | Momtahan et al. |
| 8,595,368 B2 | 11/2013 | Baniel et al. |
| 8,601,073 B2 | 12/2013 | Craig et al. |
| 8,605,583 B2 | 12/2013 | Cutler et al. |
| 8,626,156 B2 | 1/2014 | Marsico |
| 8,630,925 B2 | 1/2014 | Bystrom et al. |
| 8,675,487 B2 | 3/2014 | Siddam et al. |
| 8,681,622 B2 | 3/2014 | Chatterjee et al. |
| 8,683,544 B2 | 3/2014 | Foottit et al. |
| 8,787,174 B2 | 7/2014 | Riley et al. |
| 8,812,020 B2 | 8/2014 | Marsico |
| 8,818,327 B2 | 8/2014 | Shaikh |
| 9,106,769 B2 | 8/2015 | Kanode et al. |
| 9,185,510 B2 | 11/2015 | Nas |
| 2003/0003928 A1 | 1/2003 | Marjelund et al. |
| 2004/0116117 A1 | 6/2004 | Ahvonen et al. |
| 2005/0064889 A1 | 3/2005 | Haumont |
| 2005/0107091 A1 | 5/2005 | Vannithamby et al. |
| 2005/0176438 A1 | 8/2005 | Li |
| 2005/0195743 A1 | 9/2005 | Rochberger et al. |
| 2006/0013191 A1 | 1/2006 | Kavanagh |
| 2007/0004393 A1 | 1/2007 | Forsberg et al. |
| 2007/0054665 A1 | 3/2007 | Elkarat et al. |
| 2007/0066286 A1 | 3/2007 | Hurtta |
| 2007/0121812 A1 | 5/2007 | Strange et al. |
| 2007/0153995 A1 | 7/2007 | Fang et al. |
| 2007/0159976 A1 | 7/2007 | Dekeyzer et al. |
| 2007/0165599 A1 | 7/2007 | Skog et al. |
| 2007/0195788 A1 | 8/2007 | Vasamsetti et al. |
| 2007/0232301 A1 | 10/2007 | Kueh |
| 2008/0043689 A1 | 2/2008 | Walter |
| 2008/0046963 A1 | 2/2008 | Grayson et al. |
| 2008/0142599 A1 | 6/2008 | Benillouche et al. |
| 2008/0153484 A1 | 6/2008 | Boni et al. |
| 2008/0159194 A1 | 7/2008 | Westman et al. |
| 2008/0205345 A1 | 8/2008 | Sachs et al. |
| 2008/0232376 A1 | 9/2008 | Huang et al. |
| 2009/0061855 A1 | 3/2009 | Sethi et al. |
| 2009/0109845 A1 | 4/2009 | Andreasen et al. |
| 2009/0111458 A1 | 4/2009 | Fox et al. |
| 2009/0177650 A1 | 7/2009 | Petersson et al. |
| 2009/0185494 A1 | 7/2009 | Li et al. |
| 2009/0207730 A1 | 8/2009 | Stamoulis et al. |
| 2009/0219946 A1 | 9/2009 | Liu et al. |
| 2009/0225762 A1 | 9/2009 | Davidson et al. |
| 2009/0228956 A1 | 9/2009 | He et al. |
| 2009/0232019 A1* | 9/2009 | Gupta et al. ............... 370/252 |
| 2009/0270099 A1 | 10/2009 | Gallagher et al. |
| 2009/0325574 A1 | 12/2009 | Izawa et al. |
| 2010/0040047 A1 | 2/2010 | Zamora et al. |
| 2010/0048161 A1 | 2/2010 | He et al. |
| 2010/0080171 A1 | 4/2010 | Rune et al. |
| 2010/0091671 A1 | 4/2010 | Lidstrom et al. |
| 2010/0121960 A1 | 5/2010 | Baniel et al. |
| 2010/0190497 A1 | 7/2010 | Pudney et al. |
| 2010/0192170 A1 | 7/2010 | Raleigh |
| 2010/0241496 A1 | 9/2010 | Gupta et al. |
| 2010/0246500 A1 | 9/2010 | Rydnell et al. |
| 2010/0284278 A1 | 11/2010 | Alanara |
| 2010/0287121 A1 | 11/2010 | Li et al. |
| 2010/0291924 A1 | 11/2010 | Antrim et al. |
| 2010/0297985 A1 | 11/2010 | Van Erlach |
| 2010/0299451 A1 | 11/2010 | Ylgang et al. |
| 2011/0035495 A1 | 2/2011 | Ekström et al. |
| 2011/0067085 A1 | 3/2011 | Brouard et al. |
| 2011/0076985 A1 | 3/2011 | Chami et al. |
| 2011/0103261 A1 | 5/2011 | Duan |
| 2011/0116382 A1 | 5/2011 | McCann et al. |
| 2011/0122886 A1 | 5/2011 | Willars et al. |
| 2011/0138066 A1 | 6/2011 | Kopplin et al. |
| 2011/0158090 A1* | 6/2011 | Riley ................ H04L 12/14 370/230 |
| 2011/0165901 A1 | 7/2011 | Baniel et al. |
| 2011/0171958 A1 | 7/2011 | Hua et al. |
| 2011/0188457 A1 | 8/2011 | Shu et al. |
| 2011/0199903 A1 | 8/2011 | Cuervo |
| 2011/0217979 A1 | 9/2011 | Nas |
| 2011/0225281 A1 | 9/2011 | Riley et al. |
| 2011/0225306 A1 | 9/2011 | Delsesto et al. |
| 2011/0299395 A1 | 12/2011 | Mariblanca Nieves |
| 2011/0307790 A1 | 12/2011 | Pandya et al. |
| 2011/0317557 A1 | 12/2011 | Siddam et al. |
| 2012/0014332 A1 | 1/2012 | Smith et al. |
| 2012/0028626 A1 | 2/2012 | Marocchi et al. |
| 2012/0039175 A1 | 2/2012 | Sridhar et al. |
| 2012/0044867 A1 | 2/2012 | Faccin et al. |
| 2012/0052866 A1 | 3/2012 | Froehlich et al. |
| 2012/0057463 A1* | 3/2012 | Hurtta et al. ................ 370/236 |
| 2012/0087368 A1 | 4/2012 | Kunarathnam et al. |
| 2012/0094685 A1 | 4/2012 | Marsico |
| 2012/0099438 A1 | 4/2012 | Wang et al. |
| 2012/0099529 A1 | 4/2012 | Williams |
| 2012/0099715 A1 | 4/2012 | Ravishankar et al. |
| 2012/0100849 A1 | 4/2012 | Marsico |
| 2012/0115478 A1 | 5/2012 | Gunaratnam et al. |
| 2012/0131165 A1 | 5/2012 | Baniel et al. |
| 2012/0140632 A1 | 6/2012 | Norp et al. |
| 2012/0142311 A1* | 6/2012 | Rui et al. ................. 455/406 |
| 2012/0155389 A1 | 6/2012 | McNamee et al. |
| 2012/0176894 A1 | 7/2012 | Cai et al. |
| 2012/0203781 A1 | 8/2012 | Wakefield |
| 2012/0213072 A1* | 8/2012 | Kotecha ............ H04W 28/0268 370/235 |
| 2012/0215930 A1* | 8/2012 | Stenfelt et al. ............... 709/228 |
| 2012/0221445 A1 | 8/2012 | Sharma |
| 2012/0221693 A1 | 8/2012 | Cutler et al. |
| 2012/0250573 A1 | 10/2012 | Kulasingam et al. |
| 2012/0250613 A1 | 10/2012 | Robinson et al. |
| 2012/0257499 A1 | 10/2012 | Chatterjee et al. |
| 2012/0281617 A1 | 11/2012 | Bumiller |
| 2012/0290452 A1 | 11/2012 | Pancorbo Marcos et al. |
| 2012/0303796 A1 | 11/2012 | Mo et al. |
| 2013/0039176 A1 | 2/2013 | Kanode et al. |
| 2013/0041994 A1 | 2/2013 | Terrien et al. |
| 2013/0070594 A1 | 3/2013 | Garcia Martin et al. |
| 2013/0079006 A1 | 3/2013 | Cho et al. |
| 2013/0114404 A1 | 5/2013 | Yang |
| 2013/0160058 A1 | 6/2013 | Albal et al. |
| 2013/0163429 A1 | 6/2013 | Dunstan et al. |
| 2013/0177146 A1 | 7/2013 | Schneider et al. |
| 2013/0265911 A1 | 10/2013 | Kulaingam et al. |
| 2013/0279401 A1* | 10/2013 | Sander et al. ................ 370/328 |
| 2014/0011512 A1 | 1/2014 | Hu et al. |
| 2014/0022897 A1 | 1/2014 | Rajagopalan et al. |
| 2014/0031029 A1 | 1/2014 | Rajagopalan et al. |
| 2014/0040975 A1 | 2/2014 | Raleigh et al. |
| 2015/0011182 A1 | 1/2015 | Goldner et al. |

FOREIGN PATENT DOCUMENTS

| | | |
|---|---|---|
| CN | ZL201080064945.X | 11/2015 |
| EP | 0 857 399 B1 | 5/2004 |
| EP | 1 501 242 A2 | 1/2005 |
| EP | 1 551 144 A1 | 7/2005 |
| EP | 1 988 680 A1 | 11/2008 |
| EP | 2 093 931 A1 | 8/2009 |
| EP | 2 289 283 B1 | 2/2014 |
| EP | 2 520 045 B1 | 7/2015 |
| WO | WO 2007/092573 A2 | 8/2007 |
| WO | WO 2008/000287 A1 | 1/2008 |
| WO | WO 2009/058067 A1 | 5/2009 |
| WO | WO 2009/149341 A2 | 12/2009 |

(56) References Cited

FOREIGN PATENT DOCUMENTS

| WO | WO 2011/082035 A2 | 7/2011 |
|---|---|---|
| WO | WO 2014/014829 A1 | 1/2014 |
| WO | WO 2014/015331 A1 | 1/2014 |

OTHER PUBLICATIONS

Notification of Transmittal of the International Search Report and the Written Opinion of the International Searching Authority, or the Declaration for International Application No. PCT/US2013/050497 (Oct. 29, 2013).
Ye et al., "Enabling Local Breakout from eNB in LTE Networks," 2012 IEEE International Conference on Communications (ICC), pp. 6982-6986 (Jun. 10-15, 2012).
Balbás et al., "Policy and Charging Control in the Evolved Packet System," LTE—3GPP Release 8, IEEE Communications Magazine, pp. 68-74 (Feb. 2009).
Final Office Action & Applicant-Initiated Interview Summary for U.S. Appl. No. 13/947,314 (Jul. 16, 2015).
Notice of Allowance and Fee(s) Due & Examiner-Initiated Interview Summary for U.S. Appl. No. 13/040,020 (Jul. 8, 2015).
Final Office Action for U.S. Appl. No. 13/942,323 (Jun. 9, 2015).
Advisory Action Before the Filing of Appeal Brief and AFCP 2.0 Decision for U.S. Appl. No. 13/572,132 (Jun. 4, 2015).
Communication under Rule 71(3) EPC for European Patent Application No. 10841576.1 (May 7, 2015).
Applicant-Initiated Interview Summary for U.S. Appl. No. 13/572,132 (Apr. 29, 2015).
Applicant-Initiated Interview Summary for U.S. Appl. No. 13/040,020 (Apr. 28, 2015).
Communication of European Publication Number and Information on the Application of Article 67(3) EPC for European Patent Application No. 13820508.3 (Apr. 22, 2015).
Communication of European Publication Number and Information on the Application of Article 67(3) EPC for European Application No. 13819665.4 (Apr. 22, 2015).
Notification of the Second Office Action for Chinese Patent Application No. 201080064945.X (Apr. 22, 2015).
Notice of Allowance and Fee(s) Due and Interview Summary for U.S. Appl. No. 13/572,156 (Apr. 6, 2015).
Final Office Action for U.S. Appl. No. 13/572,132 (Mar. 11, 2015).
Non-Final Office Action for U.S. Appl. No. 13/942,323 (Feb. 25, 2015).
Non-Final Office Action for U.S. Appl. No. 13/040,020 (Jan. 29, 2015).
Non-Final Office Action for U.S. Appl. No. 13/947,314 (Jan. 16, 2015).
Final Office Action for U.S. Appl. No. 13/572,156 (Dec. 29, 2014).
Advisory Action and Examiner-Initiated Interview Summary for U.S. Appl. No. 13/040,020 (Dec. 5, 2014).
Final Office Action for U.S. Appl. No. 13/040,020 (Sep. 19, 2014).
First Office Action for Chinese Application No. 201080064945.X (Sep. 17, 2014).
Non-Final Office Action for U.S. Appl. No. 13/572,132 (Aug. 11, 2014).
Non-Final Office Action for U.S. Appl. No. 13/572,156 (May 23, 2014).
Communication of extended European Search Report for European Patent Application No. 10841576.1 (May 9, 2014).
Non-Final Office Action for U.S. Appl. No. 13/040,020 (Apr. 21, 2014).
Applicant-Initiated Interview Summary for U.S. Appl. No. 13/040,020 (Mar. 20, 2014).
Notice of Allowance and Fee(s) Due for U.S. Appl. No. 12/973,228 (Mar. 20, 2014).
Notice of Allowance and Fee(s) Due for U.S. Appl. No. 13/251,784 (Feb. 12, 2014).
Final Office Action for U.S. Appl. No. 13/040,020 (Dec. 13, 2013).

Notification of Transmittal of the International Search Report and the Written Opinion of the International Searching Authority, or the Declaration for International Application No. PCT/US2013/050512 (Dec. 2, 2013).
Notice of Allowance and Fee(s) Due for U.S. Appl. No. 13/330,086 (Nov. 6, 2013).
Notification of Transmittal of the International Search Report and the Written Opinion of the International Searching Authority, or the Declaration for International Application No. PCT/US2013/051447 (Oct. 28, 2013).
Non-Final Office Action for U.S. Appl. No. 12/973,228 (Oct. 25, 2013).
Non-Final Office Action for U.S. Appl. No. 13/251,784 (Oct. 10, 2013).
Advisory Action for U.S. Appl. No. 13/251,784 (Sep. 6, 2013).
Notice of Allowance and Fee(s) Due for U.S. Appl. No. 13/276,916 (Sep. 3, 2013).
Non-Final Office Action for U.S. Appl. No. 13/040,020 (Jul. 18, 2013).
Final Office Action for U.S. Appl. No. 13/251,784 (Jun. 26, 2013).
Final Office Action for U.S. Appl. No. 12/973,228 (Jun. 21, 2013).
"3rd Generation Partnership Project; Technical Specification Group Core Network and Terminals; Access to the 3GPP Evolved Packet Core (EPC) via non-3GPP access networks; Stage 3 (Release 12)," 3GPP TS 24.302, V12,1.0, pp. 1-68 (Jun. 2013).
Non-Final Office Action for U.S. Appl. No. 13/276,916 (Apr. 11, 2013).
Non-Final Office Action for U.S. Appl. No. 12/973,228 (Feb. 1, 2013).
Non-Final Office Action for U.S. Appl. No. 13/251,784 (Dec. 19, 2012).
Communication of European Publication Number and Information on the Application of Article 67(3) EPC for European Patent Application No. 10841576.1 (Oct. 10, 2012).
"Digital cellular telecommunications system (Phase 2+); Universal Mobile Telecommunications System (UMTS); LTE; Policy and charging control architecture (3GPP TS 23.203 version 8.14.0 Release 8)," ETSI TS 123 203, pp. 1-118 (Jul. 2012).
Notification of Transmittal of the International Search Report and the Written Opinion of the International Searching Authority, or the Declaration for International Patent Application No. PCT/US2010/061586 (Sep. 26, 2011).
3GPP, "3rd Generation Partnership Project; Technical Specification Group Services and System Aspects; Universal Geographical Area Description (GAD) (Release 10)," 3GPP TS 23.032 V10.0.0, pp. 1-29 (Mar. 2011).
"Smart Cards; Card Application Toolkit (CAT) (Release 9)," ETSI TS 102 223 V9.2.0, pp. 1-209 (Oct. 2010).
3GPP, "3rd Generation Partnership Project; Technical Specification Group GSM/EDGE Radio Access Network; Mobile Radio Interface Layer 3 Specification; Radio Resource Control (RRC) Protocol (Release 10)," 3GPP TS 44.018 V10.0.0, pp. 1-429 (Sep. 2010).
3GPP, "3rd Generation Partnership Project; Technical Specification Group Radio Access Network; Evolved Universal Terrestrial Radio Access (E-UTRA); Radio Resource Control (RRC); Protocol Specification (Release 9)," 3GPP TS 36.331 V9.4.0, pp. 1-252 (Sep. 2010).
3GPP, "3rd Generation Partnership Project; Technical Specification Group Radio Access Network; Radio Resource Control (RRC); Protocol Specification (Release 9)," 3GPP TS 25.331, V9.4.0, pp. Jan. 1789 (Sep. 2010).
3GPP, "3rd Generation Partnership Project; Technical Specification Group Core Network and Terminals; UICC-terminal Interface; Physical and Logical Characteristics (Release 9)," 3GPP TS 31.101, V9.1.0, pp. 1-35 (Jun. 2010).
3GPP, "3rd Generation Partnership Project; Technical Specification Group Core Network and Terminals; Non-Access-Stratum (NAS) Functions Related to Mobile Station (MS) in Idle Mode (Release 10)," 3GPP TS 23.122 v10.0.0, pp. 1-41 (Jun. 2010).

(56) References Cited

OTHER PUBLICATIONS

3GPP, "Universal Mobile Telecommunications System (UMTS); LTE; 3GPP Evolved Packet System (EPS); Evolved General Packet Radio Service (GPRS) Tunnelling Protocol for Control Plane (GTPv2-C); Stage 3 (3GPP TS 29.274 version 9.3.0 Release 9)," ETSI TS 129 274 V9.3.0, pp. 1-162 (Jun. 2010).
3GPP, "3rd Generation Partnership Project; Technical Specification Group Services and System Aspects; Telecommunication management; Charging management; Diameter charging applications (Release 9)," 3GPP TS 32.299 V9.4.0, pp. 1-149 (Jun. 2010).
Znaty, "Diameter, GPRS, (LTE+ePC=EPS), IMS, PCC and SDM," Effort, pp. 1-229 (Part 1 of 2) (May 2010).
Znaty, "Diameter, GPRS, (LTE+ePC=EPS), IMS, PCC and SDM," Efort pp. 230-461 (Part 2 of 2) (May 2010).
Universal Mobile Telecommunications System (UMTS); LTE; Policy and Charging Control over Gx Reference Point (3GPP TS 29.212 version 9.2.0 Release 9),' ETSI TS 129 212 V9.2.0, pp. 1-115 (Apr. 2010).
3GPP, "3rd Generation Partnership Project; Technical Specification Group Core Network and Terminals; Policy and Charging Control over Gx Reference Point (Release 9)," 3GPP TS 29.212 V9.2.0, pp. 1-111 (Mar. 2010).
3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).
Calhoun et al., "Diameter Base Protocol," RFC 3588, pp. 1-147 (Sep. 2003).
International Standard, "Maritime Navigation and Radiocommunication Equipment and Systems—Digital Interfaces—Part 1: Single Talker and Multiple Listeners," IEC 61162-1, Second edition, pp. 1-86 (Jul. 2000).
Office Action for Canadian Application No. 2,730,103 (Apr. 16, 2015).
Letter Regarding Decision to grant a Chinese patent for Chinese Application No. ZL200980130515.0 (Dec. 2, 2014).
Notification of the Third Office Action for Chinese Application No. 200980130515.0 (Jun. 26, 2014).
Decision to grant a European patent pursuant to Article 97(1) EPC for European Application No. 09759499,8 (Jan. 23, 2014).
Second Office Action for Chinese Application No. 200980130515.0 (Dec. 10, 2013).
Communication Under Rule 71(3) EPC for European Patent Application No. 09759499.8 (Aug. 14, 2013).
Notice of Allowance and Fee(s) Due for U.S. Appl. No. 12/479,179 (Jul. 9, 2013).
Interview Summary for U.S. Appl. No. 12/479,179 (Jul. 1, 2013).
First Office Action for Chinese Patent Application No. 200980130515.0 (Apr. 24, 2013).
Final Office Action for U.S. Appl. No. 12/479,179 (Feb. 15, 2013).
Notice of Allowance and Fee(s) Due for U.S. Appl. No. 13/225,390 (Oct. 9, 2012).
Non-Final Official Action for U.S. Appl. No. 12/479,179 (Sep. 13, 2012).
European Search Report for European Patent Application No. EP 09 75 9499 (Sep. 12, 2012).
Applicant-Initiated Interview Summary for U.S. Appl. No. 13/225,390 (Aug. 13, 2012).
Non-Final Official Action for U.S. Appl. No. 13/225,390 (May 14, 2012).
Final Official Action for U.S. Appl. No. 12/479,179 (Apr. 10, 2012).
Non-Final Official Action for U.S. Appl. No. 12/479,179 (Aug. 2, 2011).
Restriction Requirement for U.S. Appl. No. 12/479,179 (Feb. 8, 2011).
Communication of European publication Number and information on the application of Article 67(3) EPC for European Application No. 09759499.8 (Feb. 2, 2011).
Notification of Transmittal of the International Search Report and the Written Opinion of the International Searching Authority, or the Declaration for International Application No. PCT/US2009/046395 (Dec. 28, 2009).
"Chapter 1: Overview of GPRS and UMTS," Cisco GGSN release 9.0 Configuration Guide, Cisco IOS Release 12.4(22)YE, pp. 1-1-1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (Downloaded from the Internet on May 13, 2009) (May 28, 2008).
Agilent Technologies, "Understanding DSLAM and BRAS Access Devices," White Paper, pp. 1-15 (2006).
"GPRS Tutorial," MorganDoyle Limited, pp. 1-13 (Publication Date Unknown).
Advisory Action, Applicant-Initiated Interview Summary, & AFCP 2.0 Decision for U.S. Appl. No. 13/947,314 (Dec. 3, 2015).
Non-Final Office Action for U.S. Appl. No. 13/572,132 (Nov. 27, 2015).
Advisory Action & AFCP 2.0 Decision for U.S. Appl. No. 13/942,323 (Oct. 5, 2015).
Letter Regarding Decision to Grant for Chinese Patent Application No. 201080064945.X (Sep. 1, 2015).

\* cited by examiner

METHODS, SYSTEMS, AND COMPUTER READABLE MEDIA FOR POLICY-BASED LOCAL BREAKOUT (LBO)

PRIORITY CLAIM

This application claims the benefit of U.S. Provisional Patent Application Ser. No. 61/671,692, filed Jul. 14, 2012, the disclosure of which is incorporated herein by reference in its entirety.

TECHNICAL FIELD

The subject matter described herein relates to policy configuration. More specifically, the subject matter relates to methods, systems, and computer readable media for policy-based local breakout (LBO).

BACKGROUND

Local Breakout (LBO) is a technique wherein a user data flow is diverted from its usual expected call flow through a home network and, instead, is routed through another network. For example, when LBO occurs, data services for a mobile subscriber may be handled by a network (e.g., a visited mobile network when a mobile subscriber travels to a foreign country) which may or may, not have a business and operational relationship with the home network operator of the subscriber.

Current network operators generally allow LBO to occur at a serving gateway, small cells, and/or other location. Various standards discuss LBO architecture and/or procedures. One such standard is 3GPP TR 23.829, the disclosure of which is incorporated by reference herein in its entirety. Conventional LBO procedures are generally static in nature and do not allow certain scenarios where LBO may be beneficial to a home network, a subscriber, and/or other entity. In particular, conventional LBO procedures may not be session- and/or subscriber-aware.

Accordingly, a need exists for methods, systems, and computer readable media for policy-based LBO.

SUMMARY

According to one aspect, the subject matter described herein includes a system for controlling local breakout using a policy infrastructure. The system includes a policy and charging rules function (PCRF) configured to receive an admission request associated with a subscriber from an evolved node B (eNode B) and, in response to the admission request, to install a subscriber-specific policy on the eNode B for implementing local breakout at the eNode B for the subscriber.

A method for controlling local breakout using a policy infrastructure is also disclosed. The method occurs at a policy and charging rules function (PCRF). The method includes receiving an admission request associated with a subscriber from an evolved node B (eNode B) and, in response to the admission request, installing a subscriber-specific policy on the eNode B for implementing local breakout at the eNode B for the subscriber.

A system for implementing local breakout using a policy infrastructure is also disclosed. The system includes an evolved node B (eNode B) configured to send an admission request associated with a subscriber to a policy and charging rule function (PCRF) and to receive, from the PCRF, a subscriber-specific policy for implementing local breakout at the eNode B for the subscriber.

A method for implementing local breakout using a policy infrastructure is also disclosed. The method occurs at an evolved node B (eNode B). The method includes receiving an admission request associated with a subscriber from an evolved node B (eNode B) and receiving, from the PCRF, a subscriber-specific policy for implementing local breakout at the eNode B for the subscriber.

The subject matter described herein for policy-based LBO (e.g., implementing or controlling LBO) may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits.

As used herein, the term "node" refers to a physical computing platform including one or more processors and memory.

As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for policy-based local breakout (LBO). Conventional LBO architectures provide LBO at serving gateways (SGWs), small cells, and other locations. However, none of these architectures provide a dynamic local breakout scenario wherein the local breakout is managed by policy infrastructure, e.g., a policy and charging rules function (PCRF). Moreover, conventional LBO architectures do not address offload scenarios where appropriate charging and/or accounting models necessitate the user data flow go through an operator's core for a short period of time.

In accordance with some aspects of the present subject matter, LBO may be provided at a radio access network (RAN) component or node, such as an evolved node B (eNB), and may be controlled by policy infrastructure, such as a PCRF or a policy server. By utilizing policy-based LBO, a network operator can dynamically optimize the network while being cognizant of subscribers' quality of experience (QoE) and various network conditions. For example, using policy-based LBO, if a PCRF or a policy controller becomes aware that an operator's network is becoming overloaded, it may utilize pre-established peering arrangements with several service providers to offload network traffic to manage the flow of the traffic through one peer over the other. Moreover, by providing dynamic LBO at a RAN component, a total number of nodes in the media path may be minimized (e.g., as compared to conventional LBO at a SGW), thus optimizing media delivery and reducing cost (e.g., cost-per-bit) for the operator.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
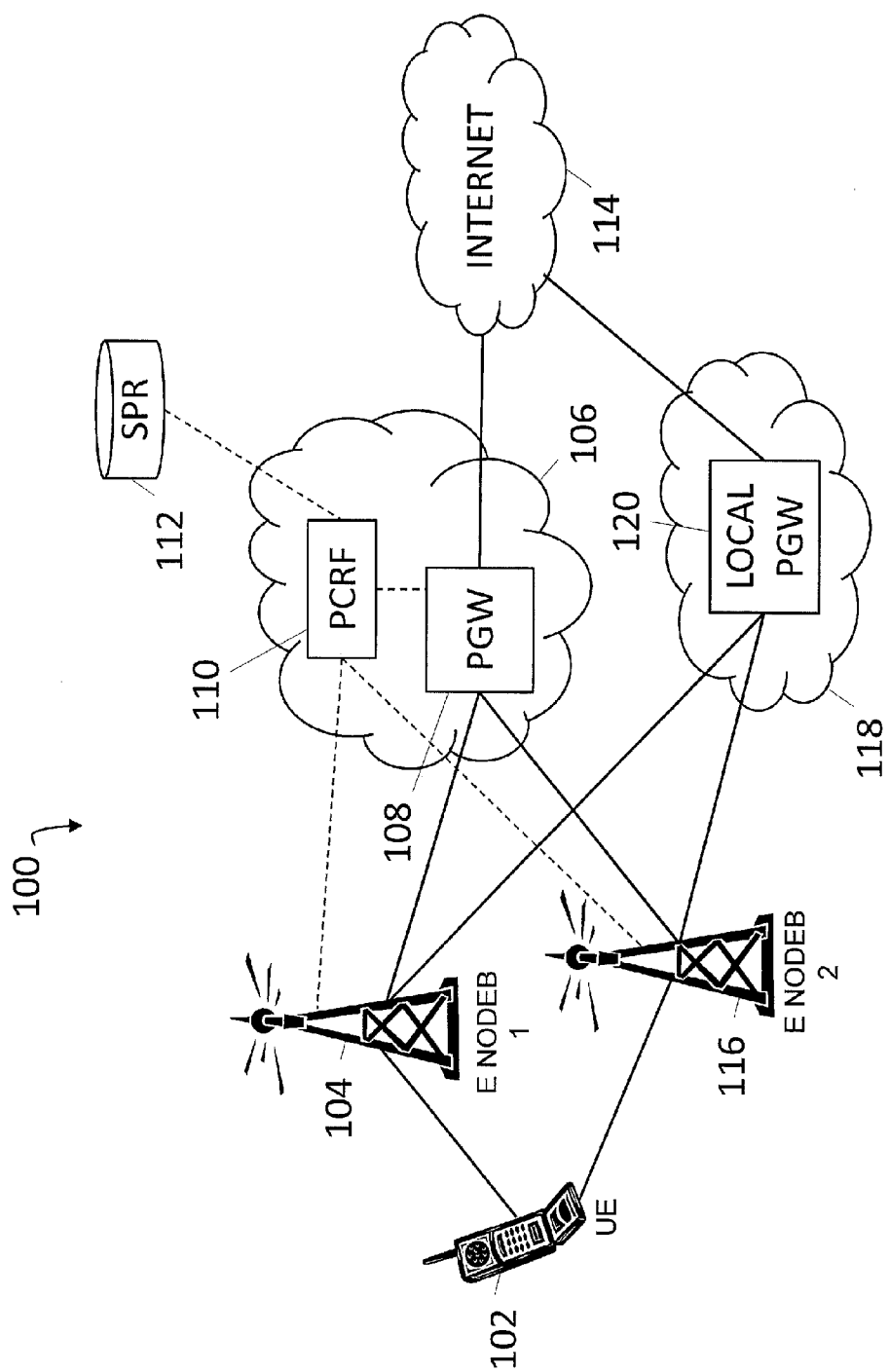
FIG. 1 is a network diagram showing an exemplary network for policy-based LBO according to an embodiment of the subject matter described herein.

FIG. 1 is a network diagram showing an exemplary network for policy-based LBO according to an embodiment of the subject matter described herein. FIG. 1 is a block diagram illustrating an exemplary communications network 100 according to an embodiment of the subject matter described herein. Referring to FIG. 1, network 100 may include user equipment (UE) 102, an access node or evolved node B (eNB) 1 104, a policy and charging enforcement function (PCEF) or packet data network gateway (PGW) 108, a policy controller or PCRF 110, a subscriber profile repository (SPR) 112, an access node or eNB 2 116, a visitor network 118, a local PGW 120, a core network 106, and Internet 114.

UE 102 represents a device, such as a mobile handset, for communicating with one or more portions of network 100. For example, UEs 102 may include a computer, a pager, a smartphone, a phone, a wireless modem, a hotspot, a computing platform, a mobile handset, and other subscriber devices.

UE 102 may communicate with eNB 1 104 and/or eNB 2 116. ENB 1 104 and/or eNB 2 116 may be located within the same access network or different access networks. An access network may include nodes, functions, devices, and/or components for providing a UE 102 access to services, functions, or devices in one or more networks (e.g., core network 106). For example, an access network may include a radio access network (RAN), such as a universal mobile telecommunications system (UMTS) RAN (UTRAN), an evolved UTRAN (eUTRAN), a High Speed Packet Access (HSPA) network, or an evolved HSPA (eHSPA+) network.

ENB 1 104 and/or eNB 2 116 may perform radio access functions for connecting UE 102 with various communications networks and/or nodes. ENB 1 104 and/or eNB 2 116 may communicate with core network 106 using gateway functionality. For example, eNB 2 116 or other node (e.g., a gateway) may communicate messages (e.g., authentication or mobility related messages) to one or more nodes within the core network 106.

In some embodiments, eNB 1 104 and/or eNB 2 116 may communicate with PCRF 110 for determining whether to perform LBO for a given subscriber or service data flow. For example, when a subscriber is attempting to use an access network, eNB 1 104 may send an admission request to PCRF. In response to receiving the admission request, PCRF 110 may determine that a policy and charging control (PCC) rule or policy should be sent or installed on eNB 104. The PCC rule or policy may be for allowing or disallowing eNB 104 to perform LBO (e.g., offloading data services involving Internet 114 to local network 118 instead of routing service data flows (SDFs) through core network 108). In some embodiments, the PCC rule or policy may indicate particular services and/or SDFs that can be offloaded (e.g., via local PGW 120).

In some embodiments, eNB 1 104 and/or eNB 2 116 may be configured to function as a PCEF or perform PCEF-like functions. For example, eNB 1 104 and/or eNB 2 116 may communicate with PCRF 110 and may receive a PCC rule or policy. After receiving the PCC rule or policy, eNB 1 104 and/or eNB 2 116 may enforce the PCC rule or policy.

Core network 106 may be a network for providing services to UE 102. For example, core network 106 may perform network aggregation, charging, and authentication functions for UE 102. In some embodiments, core network 106 may be a 4G network, an LTE network, an EPC network, a 3rd Generation Partnership Project (3GPP) network, or other network.

Core network 106 may include PGW 108 and PCRF 110. Core network 106 may also include other nodes, such as an SPR 112, a Diameter relay agent and/or a Diameter signaling router (DRA/DSR), a mobility management entity (MME), a home subscriber server (HSS), an authentication, authorization, and accounting (AAA) server, and a bearer binding and event reporting function (BBERF).

PGW 108 may be any suitable entity for providing access to Internet 114 or other data networks. PGW 108 may include functionality located at a gateway (e.g., a packet data network (PDN) gateway) or other node for communicating between networks, e.g., Internet 114 and core network 106.

In some embodiments PGW 108 may include a PCEF or similar functionality. For example, PGW 108 may manage and/or enforce policy and charging control (PCC) rules provided by PCRF 110. For example, rules may be provided for each SDF and/or each UE 102 attempting to use PGW 108. In this example, PGW 108 may control access to external networks and charge for such access based on rules received from PCRF 110.

In some embodiments, PGW 108 may include or be integrated with a gateway GPRS support node (GGSN) for communicating between a GPRS network and external networks, e.g., Internet 126 or private network 128. For example, in an embodiment where core network 106 includes a GPRS core network, PGW 108 may include a GGSN. PGW 108 may communicate with serving GPRS support node (SGSN) or other gateway for providing services to UE 102. For example, PGW 108 may request and receive PCC rules from PCRF 110. Using the PCC rules, PGW 108 may control access to external networks and charge for such access based on the PCC rules. For example, for an SDF (e.g., one or more related packets) that is under policy control, PGW 108 may allow the SDF to pass through the node if the corresponding gate is open (e.g., as determined by one or more relevant PCC rules). For an SDF that is under charging control, PGW 108 may allow the SDF to pass through the node if there is a corresponding active PCC rule and, for online charging, the OCS has authorized the applicable credit with that charging key. PGW 108 may let an SDF pass through the gateway during the course of the credit re-authorization procedure. If requested by PCRF 110, PGW 108 may report to PCRF 110 when the status of the related SDF changes, which can be used to monitor a bearer path dedicated for AF signaling traffic.

PGW 108 may also include a BBERF. The BBERF may be any suitable entity for performing bearer binding and/or event reporting. In some embodiments, the BBERF may control user plane traffic. For example, the BBERF may ensure that an SDF is carried over a bearer path with an appropriate quality of service and may perform resource reservation. The BBERF may also provide event reporting to one or more nodes in network 100. For example, the BBERF may inform PCRF 110 of various network or bearer-related events, e.g., based on event triggers installed or requested by PCRF 110.

PCRF 110 may be any suitable entity for creating, selecting, or otherwise determining policies (e.g., one or more PCC rules). For example, PCRF 110 may be a stand-alone node, e.g., a policy server or a multimedia policy engine (MPE), or may be co-located or integrated with one or more nodes in network 100, e.g., a DRA/DSR. PCRF 110 may inform PGW 108, through the use of PCC rules, on the treatment of each SDF that is under PCC control, in accordance with policy decisions. In performing policy decisions, PCRF 110 may communicate with one or more nodes in network 100 for gathering subscription related information. For example, PCRF 110 may communicate with SPR 112 to retrieve policy information. In another example, PCRF 110 may communicate with a network management system (NMS), e.g., via a simple network management protocol (SNMP) interface. In this example, PCRF 110 may poll or otherwise query the NMS or a related database to receive information, e.g., regarding the state of one or more devices in an access network, core network, or other network.

Subscription related information may be used (e.g., by PCRF 110) to generate PCC rules. PCC rules typically include information for managing user plane traffic (e.g., data packets). For example, a PCC rule may include a rule name, service identifier, SDF filter(s), precedence information, gate status, QoS parameters, charging key (i.e., rating group), other charging parameters, and/or monitoring key. The rule name or PCC rule identifier may be used to reference a PCC rule in the communication between the PCEF and the PCRF and may be unique for each PCC rule used during an IP-CAN session. The service identifier may be used to identify the service or the service component to which the SDF relates. The SDF filter(s) may be used to select the traffic for which the rule applies. For example, an SDF filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). In this example, packets containing information matching the IP five-tuple may be considered part of the SDF for which the corresponding PCC rule is to be applied. In another example, an SDF filter may be based on fewer, different, and/or additional criteria. For instance, UE 102 or another node in network 100 may assign an SDF identifier (e.g., a value) to packets in a custom parameter field. In this instance, an SDF filter in a PCC rule may use this parameter for determining traffic for which the rule applies.

PCC policy decisions may be based on one or more of the following: information obtained from an AF via the Rx interface (e.g., session, media, and subscriber related information), information obtained from PGW 108 (e.g., bearer attributes, request type, device information, and subscriber related information), SPR information (e.g., subscriber and service related data), and pre-configured information. If the information from PGW 108 contains traffic mapping information not matching any SDF filter known to PCRF 110, and PCRF 110 allows the UE to request enhanced QoS for services not known to PCRF 110, PCRF 110 may add the traffic mapping information as SDF filters to the corresponding authorized PCC rule. PCRF 110 may wildcard missing filter parameters, e.g., missing uplink TFT address and port information in case of GPRS. For example, a blank or "wildcard" filter (e.g., port number="*") may consider any value (including an empty or zero value) as matching the filter criteria.

SPR 112 may represent a suitable entity for storing or maintaining subscription related information, such as subscription profiles, policy information, and/or PCC rules. For example, SPR 112 may include a database, an HSS, an AAA, or other node. SPR 112 may store policy information for use by PCRF 110 in making policy decisions. In one embodiment, a subscription profile may include authorization information, charging information, subscription information (e.g., access or service tiers), and quality of service (QoS) information associated with a subscriber, session, device, and/or an SDF. For example, a subscription profile may include information on a subscriber's permitted services, service pre-emption priorities, allowed QoS, and charging related data information for different types of SDFs.

SPR 112 may communicate with PCRF 110 and various other nodes, e.g., a HSS, an AAA, an MME and or a DRA/DSR. SPR 112 may be located external to or distinct from PCRF 110 or may be co-located or integrated with PCRF 110.

Visitor network 118 may be a network for providing services to UE 102 distinct from core network 104. For example, visitor network 118 may be a cellular or mobile network located in a foreign country from core network 108. In some embodiments, visitor network 118 may be associated with or include eNB 1 104 or eNB 2 116. In some embodiments, visitor network 118 may be a 4G network, an LTE network, an EPC network, a 3GPP network, or other network.

In some embodiments, visitor network 118 may have service agreements for providing access and services for subscribers associated with core network 106. In some embodiments, visitor network 118 may have no service agreements with core network 106 and/or may perform services for roaming subscribers on a dynamic or pre-paid basis.

Visitor network 118 may include local PGW 120. Visitor network 118 may also include other nodes, such as a MME or AAA server. Local PGW 120 may be any suitable entity for providing access to Internet 114 or other data networks. Local PGW 120 may include functionality for communicating between networks, e.g., Internet 114 and visitor network 118.

In some embodiments, local PGW 120 may include a PCEF or similar functionality. For example, local PGW 120 may manage and/or enforce policy and charging control (PCC) rules provided by PCRF 110. For example, rules may be provided for each SDF and/or each UE 102 attempting to use local PGW 120. In this example, local PGW 120 may control access to external networks and charge for such access based on rules received from PCRF 110.

It will be appreciated that FIG. 1 is for illustrative purposes and that various nodes, their locations, and/or their functions may be changed, altered, added, or removed. For example, some nodes and/or functions may be combined into a single entity, e.g., SPR 112 and PCRF 110 may be included in an MPE. In a second example, a node and/or function may be located at or implemented by two or more nodes.

Figure 2:
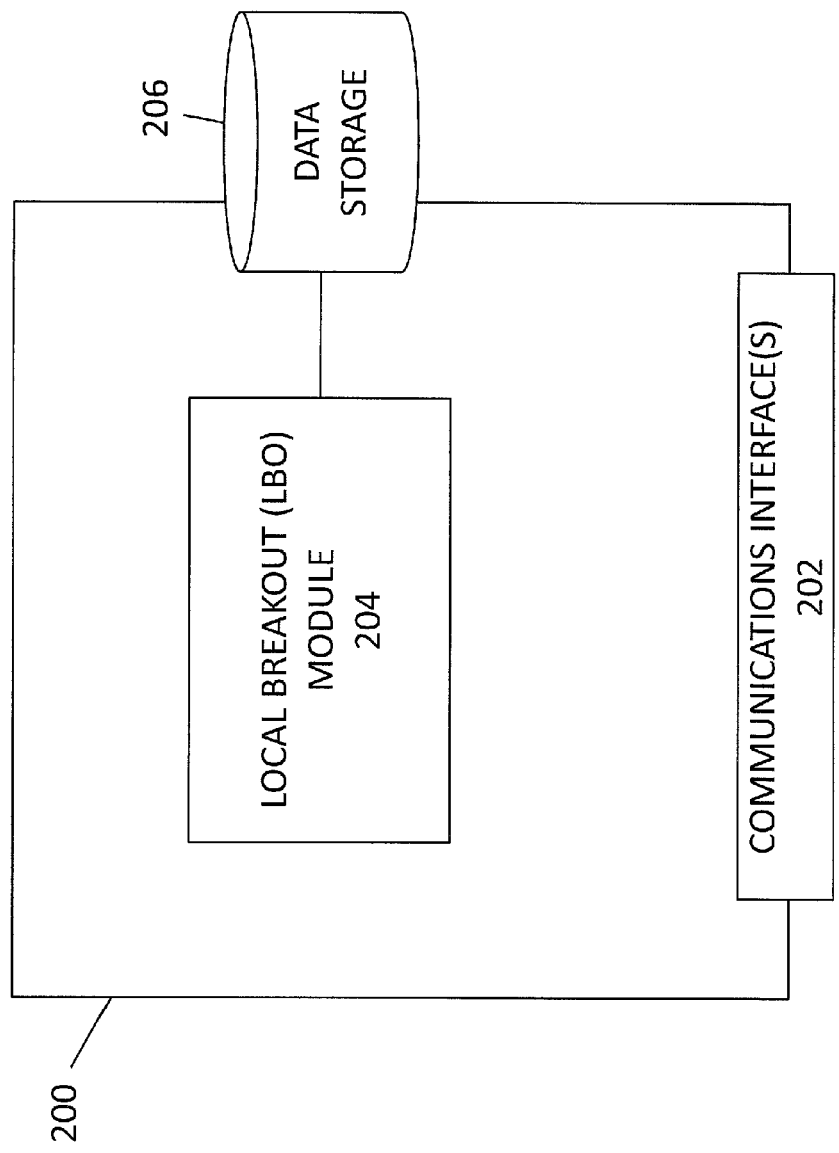
FIG. 2 is block diagram illustrating an exemplary policy node for policy-based LBO according to an embodiment of the subject matter described herein.

FIG. 2 is block diagram illustrating an exemplary node 200 for policy-based LBO according to an embodiment of the subject matter described herein. Node 200 may be configured to control or determine LBO, e.g., a policy node, or may be configured to implement LBO, e.g., a RAN node like eNB 1 104 or eNB 2 116. Node 200 may be a stand-alone node or may be integrated with additional functionality or another node. In some embodiments, node 200 may include a PCRF, an eNB, or similar functionality.

Referring to FIG. 2, node 200 may include one or more communications interfaces 202 for communicating messages (e.g., via a Gx interface, Gxx interface, S1 interface, S7 interface, Sp interface, an extensible markup language (XML) interface, a session initiation protocol (SIP) interface, a SOAP interface, or a hypertext transfer protocol (HTTP) interface or others). In some embodiments, a credit control request (CCR) or an admission request may be received or sent via a Gx interface or an S1 interface for requesting policy information (e.g., PCC rules). In some embodiments, other interfaces may be used for communicating messages, controlling or implementing LBO, and/or performing other functions.

Node 200 may include an LBO module 204. LBO module 204 may be any suitable entity (e.g., software executing on a processor) for performing one or more aspects of the subject matter described herein, such as controlling and/or implementing LBO. Depending on the location or usage of node 200, LBO module 204 may be configured to determine whether LBO should be implemented at a RAN node for certain subscribers or may be configured to enforce policies and/or implement or not implement LBO.

In some embodiments, where node 200 includes a PCRF 110 or PCRF functionality, LBO module 204 may include functionality for determining whether LBO should be implemented at a RAN node. For example, LBO module 204 may include functionality for receiving an admission request or other message from eNB 1 104 or eNB 2 116. LBO modules 204 may include functionality for querying SPR 112 and/or other sources. Using information gathered, LBO module 204 may generate a policy (e.g., one or more PCC rules) for instructing eNB 1 104 or eNB 2 116 to allow or disallow (not allow) LBO at the RAN for the subscriber. LBO modules 204 may include functionality for providing the policy to eNB 1 104 or eNB 2 116.

In some embodiments, where node 200 includes a RAN node, LBO module 204 may include functionality for enforce policies from PCRF 110 and/or for implementing or not implementing LBO based on the received policies. For example, LBO module 204 may include functionality for communicating with PCRF 110, receiving a policy (e.g., one or more PCC rules) from PCRF 110, and enforcing the policy by implementing or not implementing LBO at node 200.

Policy node 200 may access (read from and/or write information to) data storage 206. Data storage 206 may be any suitable entity (e.g., a computer readable medium or memory) for storing various data. In some embodiments, where node 200 includes a PCRF 110 or PCRF functionality, data storage 206 may include PCC rules and/or policies associated with one or more subscribers. Data storage 206 may include information for determining whether LBO should be implemented at or on a RAN node. Exemplary information usable in such determination may include network conditions, subscriber tiers, device types, location, time of day, QoS requirements, QoE requirements, service agreements, and/or other information.

In some embodiments, where node 200 includes a RAN node, data storage 106 may include associations between installed policies for enforcement and subscribers. For example, data storage 106 may include a policy that indicate a first subscriber may not use LBO procedures and a second policy that indicate a second subscriber may use LBO procedures. Using these associations, node 200 may determine which SDFs or subscribers may or may not use LBO procedures.

It will be appreciated that the above description is for illustrative purposes and that node 200 may include additional and/or different modules or components.

Figure 3:
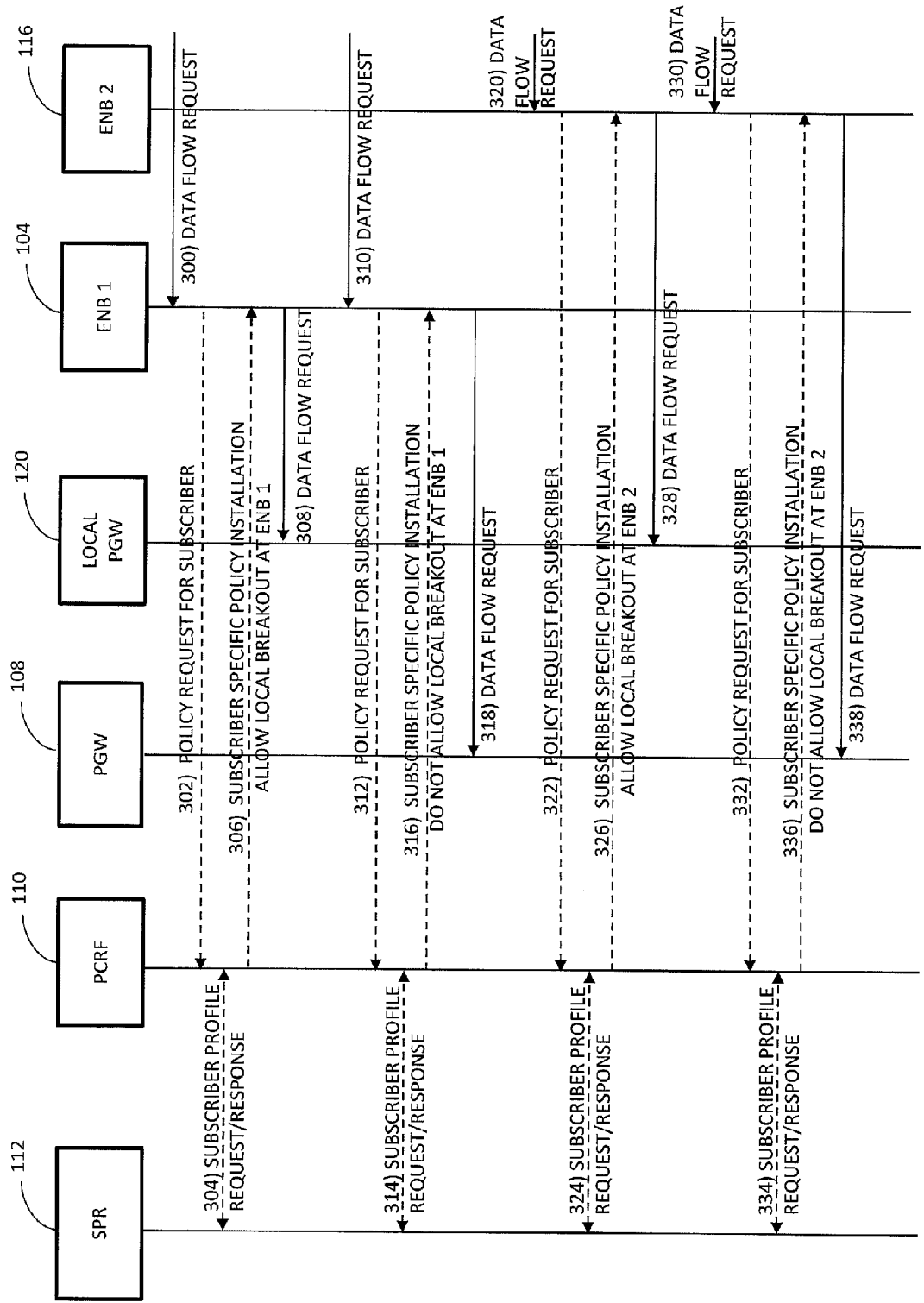
FIG. 3 is a message flow diagram illustrating policy-based LBO according to another embodiment of the subject matter described herein.

FIG. 3 is a message flow diagram illustrating policy-based LBO according to an embodiment of the subject matter described herein. At step 300, a data flow request (e.g., an admission request, a mobility management message, or other message) may be sent from UE 102 to eNB 1 104. The data flow request may be associated with a subscriber "1." At step 302, a policy request for subscriber "1" may be sent to PCRF 110. The policy request may be sent for requesting a policy regarding whether LBO is available for the subscriber at eNB 1 104. At step 304, PCRF 110 may request and receive a subscriber profile or related information from SPR 112. Using gathered information, PCRF 110 may generate a policy that instructs eNB 1 104 to allow LBO for subscriber "1". For example, PCRF 110 may determine that core network 106 is congested and that visitor network 118 is reliable. At step 306, the policy may be installed and enforced by eNB 1 104. At step 308, eNB 1 104 may implement or perform LBO and route the data flow request or other messages via local PGW 120 in visitor network 118.

At step 310, a data flow request may be sent from UE 102 to eNB 1 104. The data flow request may be associated with a subscriber "2." At step 312, a policy request for subscriber "2" may be sent to PCRF 110. The policy request may be sent for requesting a policy regarding whether LBO is available for the subscriber at eNB 1 104. For example, PCRF 110 may determine that core network 106 is not congested and/or that visitor network 118 is unreliable or insecure. At step 314, PCRF 110 may request and receive a subscriber profile or related information from SPR 112. Using gathered information, PCRF 110 may generate a policy that instructs eNB 1 104 to not allow LBO for subscriber "2". At step 316, the policy may be installed and enforced by eNB 1 104. At step 318, eNB 1 104 may route the data flow request or other messages via PGW 108 in core network 106.

At step 320, a data flow request (e.g., an admission request or other message) may be sent from UE 102 to eNB 2 116. The data flow request may be associated with a subscriber "3." At step 322, a policy request for subscriber "3" may be sent to PCRF 110. The policy request may be sent for requesting a policy regarding whether LBO is available for the subscriber at eNB 1 104. At step 324, PCRF 110 may request and receive a subscriber profile or related information from SPR 112. Using gathered information, PCRF 110 may generate a policy that instructs eNB 2 116 to allow LBO for subscriber "3". For example, PCRF 110 may determine that subscriber "3" is associated with a preferred subscriber tier and/or uses a preferred device. In this example, LBO may be allowed because visitor network 118 is secure and uncongested, while core network 106 is congested. At step 326, the policy may be installed and enforced by eNB 2 116. At step 328, eNB 2 116 may implement or perform LBO and route the data flow request or other messages via local PGW 120 in visitor network 118.

At step 330, a data flow request may be sent from UE 102 to eNB 2 116. The data flow request may be associated with a subscriber "4." At step 332, a policy request for subscriber "4" may be sent to PCRF 110. The policy request may be sent for requesting a policy regarding whether LBO is available for the subscriber at eNB 2 116. For example, PCRF 110 may determine that core network 106 is not congested but that visitor network 118 is unreliable or insecure. At step 334, PCRF 110 may request and receive a subscriber profile or related information from SPR 112. Using gathered information, PCRF 110 may generate a policy that instructs eNB 1 104 to not allow LBO for subscriber "4". At step 336, the policy may be installed and enforced by eNB 2 116. At step 338, eNB 2 116 may route the data flow request or other messages via PGW 108 in core network 106.

It will be appreciated that FIG. 3 is for illustrative purposes and that additional and/or different messages may be used in controlling or implementing LBO using a policy infrastructure in various networks or environments.

Figure 4:
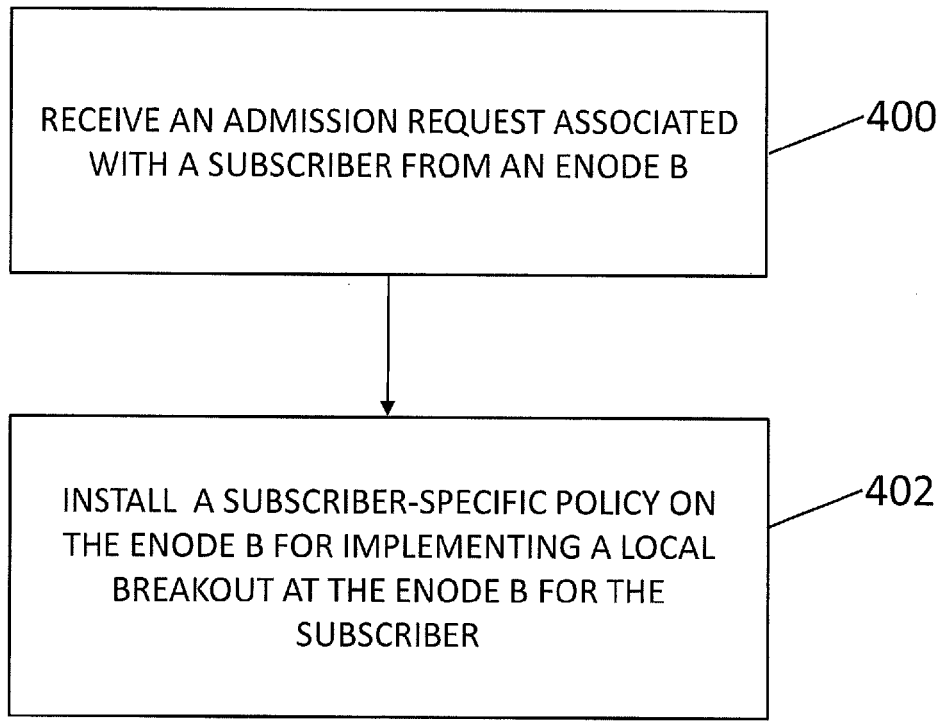
FIG. 4 is flow chart illustrating an exemplary process for controlling local breakout using a policy infrastructure according to an embodiment of the subject matter described herein.

FIG. 4 is a flow chart illustrating an exemplary process for controlling local breakout using a policy infrastructure according to an embodiment of the subject matter described herein. In some embodiments, the exemplary process described herein, or portions thereof, may be performed by node 200, PCRF 110, LBO module 204, and/or another node or module. In some embodiments, exemplary process may include steps 400, 402, and/or additional or different steps.

Referring to FIG. 4, in step 400, an admission request associated with a subscriber may be received from eNB 1 104 or eNB 2 116. For example, the admission request may be a message sent when a subscriber attempt to use eNB 1 104 or its associated access network for the first time. In another example, the admission request may be a different message for initiating a new SDF associated with Internet 114. The admission information may include a subscriber identifier, a service type identifier, and/or other information.

PCRF 110, node 200, or LBO module 204 may receive the admission request and may also query SPR 112. Using information gather from the admission request, SPR 112, and/or other sources, PCRF 110, policy node 200, or LBO module 204 may generate a policy (e.g., one or more PCC rules) for instructing eNB) 1 104 or eNB 2 116 to allow or disallow (not allow) LBO at the RAN for the subscriber.

In step 402, in response to an admission request, a subscriber-specific policy may be install on eNB 1 104 or eNB 2 116 for implementing local breakout at eNB 1 104 or eNB 2 116 for the subscriber. For example, PCRF 110 may install a policy that implements LBO at eNB 1 104 or eNB 2 116 for a first subscriber and allows SDFs associated with the first subscriber to be routed to Internet 114 through visitor network 116 and/or local PGW 116. In another example, PCRF 110 may install a policy that prevents LBO at eNB 1 104 or eNB 2 116 for a second subscriber and instead may require SDFs associated with the second subscriber to be routed to Internet 114 through core network 108 and/or PGW 108.

In some embodiments, PCRF 110 may be configured to install the subscriber-specific policy on the eNode B for implementing local breakout based on a subscriber tier. For example, a network operator may group subscribers into tier or levels of service based on data plans, types of phones, spending habits, etc. In this example, certain subscriber tiers (e.g., higher paying subscribers) may get preferential treatment with regard to data services or IP traffic while other less preferred tiers may be offloaded to less reliable networks. In another example, certain subscriber tiers (e.g., higher paying subscribers) may get preferential treatment by having their data services or IP traffic offloaded to more reliable, less congested networks.

In some embodiments, PCRF 110 may be configured to install the subscriber-specific policy on the eNode B for implementing local breakout based on a device type. For example, certain subscribers that use preferred phones (e.g., a particular type or brand of smartphones) may receive preferred routes (e.g., via core network 106) for receiving data services.

In some embodiments, PCRF 110 may be configured to install the subscriber-specific policy on the eNode B for implementing local breakout based on quality of service (QoS) or QoE requested by a UE or UE application. For example, certain UEs or applications requesting video or voice over IP (VoIP) service may receive preferred routes (e.g., via core network 106) or may be offloaded to more reliable, less congested visitor network 118.

Figure 5:
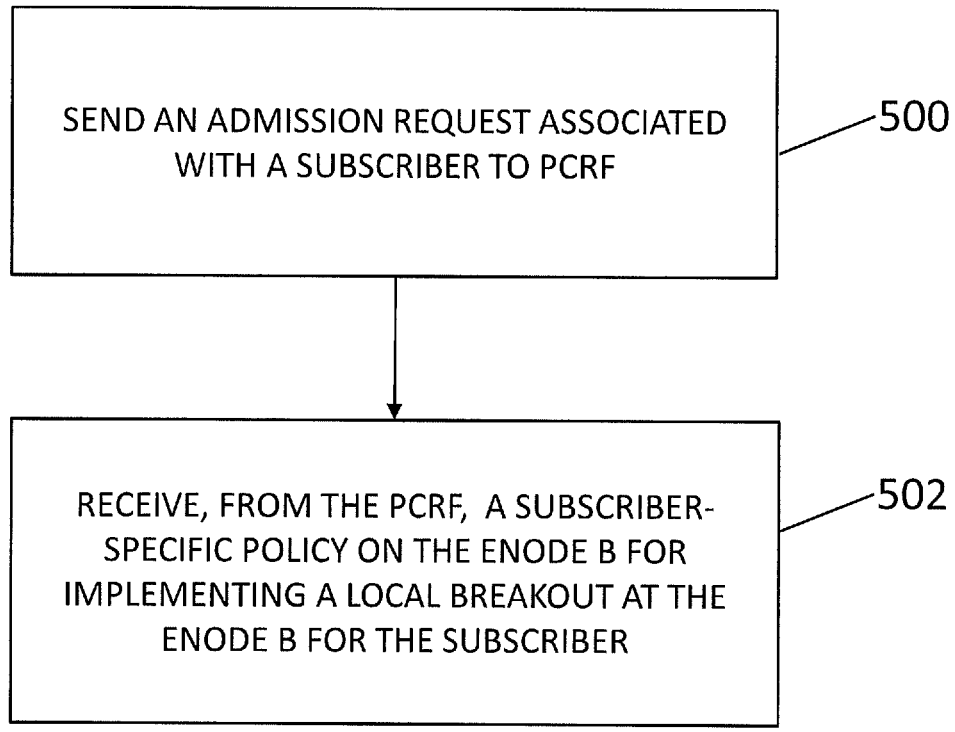
FIG. 5 is flow chart illustrating an exemplary process for implementing local breakout using a policy infrastructure according to an embodiment of the subject matter described herein.

FIG. 5 is a flow chart illustrating an exemplary process for implementing local breakout using a policy infrastructure according to an embodiment of the subject matter described herein. In some embodiments, the exemplary process described herein, or portions thereof, may be performed by eNB 1 104, eNB 2 116, and/or another node or module (e.g., another access node in a RAN). In some embodiments, exemplary process may include steps 500, 502, and/or additional or different steps.

Referring to FIG. 5, in step 500, an admission request associated with a subscriber may be sent to eNB 1 104 or eNB 2 116. For example, the admission request may be a message sent when a subscriber attempt to use eNB 1 104 or its associated access network for the first time. In another example, the admission request may be a different message for initiating a new SDF associated with Internet 114. The admission information may include a subscriber identifier, a service type identifier, and/or other information.

PCRF 110 or another node or module may receive the admission request and may also query SPR 112. Using information gather from the admission request, SPR 112, and/or other sources, PCRF 110 or another node or module may generate a policy (e.g., one or more PCC rules) for instructing eNB 1 104 or eNB 2 116 to allow or disallow (not allow) LBO at the RAN for the subscriber.

In step 502, a subscriber-specific policy may be received by eNB 1 104 or eNB 2 116 for implementing local breakout for the subscriber. For example, PCRF 110 may install a policy that implements LBO at eNB 1 104 or eNB 2 116 for a first subscriber and allows SDFs associated with the first subscriber to be routed to Internet 114 through visitor network 116 and/or local PGW 116. In another example, PCRF 110 may install a policy that prevents LBO at eNB 1 104 or eNB 2 116 for a second subscriber and instead may require SDFs associated with the second subscriber to be routed to Internet 114 through core network 108 and/or PGW 108. In yet another example, where node 200 includes a RAN node, LBO module 204 may be receive a policy and implement LBO at node 200.

In some embodiments, eNB 1 104 or eNB 2 116 may be configured to implement local breakout based on a subscriber tier.

In some embodiments, eNB 1 104 or eNB 2 116 may be configured to implement local breakout based on a device type.

In some embodiments, eNB 1 104 or eNB 2 116 may function as a PCEF.

In some embodiments, eNB 1 104 or eNB 2 116 may be configured to implement local breakout based on QoS or QoE requested by a UE or UE application.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A system for controlling local breakout using a policy infrastructure, the system comprising:
a policy and charging rules function (PCRF) configured to receive a first admission request from an evolved node B (eNode B), wherein the first admission request includes a first subscriber identifier identifying a first subscriber, to receive a second admission request from the eNode B, wherein the second admission request includes a second subscriber identifier identifying a second subscriber, wherein the admission requests are sent from the eNode B to the PCRF via a Gx or an S1 interface, to determine a first subscriber-specific policy using the first subscriber identifier, wherein the first subscriber-specific policy allows local breakout at the eNode B for the first subscriber, to determine a second subscriber-specific policy using the second subscriber identifier, wherein the second subscriber-specific policy prevents local breakout at the eNode B for the second subscriber, and to install the subscriber-specific policies on the eNode B.

2. The system of claim 1 wherein the eNode B is configured to implement local breakout based on a subscriber tier.

3. The system of claim 1 wherein the eNode B is configured to implement local breakout based on a device type.

4. The system of claim 1 wherein the eNode B functions as a policy control and enforcement function (PCEF).

5. The system of claim 1 wherein the eNode B is configured to implement local breakout based on quality of service (QoS) requested by a user equipment (UE) application.

6. A system for implementing local breakout using a policy infrastructure, the system comprising:
an evolved node B (eNode B) configured to send a first admission request associated with a subscriber to a policy and charging rules function (PCRF), wherein the first admission request includes a first subscriber identifier identifying a first subscriber, to send a second admission request from the eNode B, wherein the second admission request includes a second subscriber identifier identifying a second subscriber, wherein the admission requests are sent from the eNode B to the PCRF via a Gx or an S1 interface, to receive, from the PCRF, a first subscriber-specific policy and a second subscriber-specific policy at the eNode B, wherein the PCRF determines the first subscriber-specific policy using the first subscriber identifier, wherein the first subscriber-specific policy allows local breakout at the eNode B for the first subscriber and wherein the PCRF determines the second subscriber-specific policy using the second subscriber identifier, wherein the second subscriber-specific policy prevents local breakout at the eNode B for the second subscriber, and to implement the subscriber-specific policies at the eNode B.

7. The system of claim 6 wherein the eNode B is configured to implement local breakout based on a subscriber tier.

8. The system of claim 6 wherein the eNode B is configured to implement local breakout based on a device type.

9. The system of claim 6 wherein the eNode B functions as a policy control and enforcement function (PCEF).

10. The system of claim 6 wherein the eNode B is configured to implement local breakout based on quality of service (QoS) requested by a user equipment (UE) application.

11. A method for controlling local breakout using a policy infrastructure, the method comprising:
at a policy and charging rules function (PCRF):
receiving a first admission request from an evolved node B (eNode B), wherein the first admission request includes a first subscriber identifier identifying a first subscriber;
receiving a second admission request from the eNode B, wherein the second admission request includes a second subscriber identifier identifying a second subscriber, wherein the admission requests are sent from the eNode B to the PCRF via a Gx or an S1 interface;
determining a first subscriber-specific policy using the first subscriber identifier, wherein the first subscriber-specific policy allows local breakout at the eNode B for the first subscriber;
determining a second subscriber-specific policy using the second subscriber identifier, wherein the second subscriber-specific policy prevents local breakout at the eNode B for the second subscriber; and
installing the subscriber-specific policies on the eNode B.

12. The method of claim 11 wherein the eNode B is configured to implement local breakout based on a subscriber tier.

13. The method of claim 11 wherein the eNode B is configured to implement local breakout based on a device type.

14. The method of claim 11 wherein the eNode B functions as a policy control and enforcement function (PCEF).

15. The method of claim 11 wherein the eNode B is configured to implement local breakout based on quality of service (QoS) requested by a user equipment (UE) application.

16. The method of claim 11 wherein the eNode B is configured to implement local breakout based on a device type.

17. The method of claim 11 wherein the eNode B functions as a policy control and enforcement function (PCEF).

18. The method of claim 11 wherein the eNode B is configured to implement local breakout based on quality of service (QoS) requested by a user equipment (UE) application.

19. A method for implementing local breakout using a policy infrastructure, the method comprising:
at an evolved node B (eNode B):
sending a first admission request a policy and charging rules function (PCRF), wherein the first admission request includes a first subscriber identifier identifying a first subscriber;
sending a second admission request to the PCRF, wherein the second admission request includes a second subscriber identifier identifying a second subscriber, wherein the admission requests are sent from the eNode B to the PCRF via a Gx or an S1 interface;
receiving, from the PCRF, a first subscriber-specific policy and a second subscriber-specific policy at the eNode B, wherein the first subscriber-specific policy allows local breakout at the eNode B for the first subscriber and the second subscriber-specific policy prevents local breakout at the eNode B for the second subscriber; and implementing the subscriber-specific policies at the eNode B.

20. The method of claim 19 wherein the eNode B is configured to implement local breakout based on a subscriber tier.

* * * * *